(12) United States Patent
Fitzgerald

(10) Patent No.: US 7,451,953 B2
(45) Date of Patent: Nov. 18, 2008

(54) ADJUSTABLE FURNACE LEGS

(76) Inventor: James E. Fitzgerald, 352 Sandy Cay Dr., Miramar Beach, FL (US) 32550

( * ) Notice: Subject to any disclaimer, the term of this patent is extended or adjusted under 35 U.S.C. 154(b) by 0 days.

(21) Appl. No.: 11/531,486

(22) Filed: Sep. 13, 2006

(65) Prior Publication Data

US 2007/0152118 A1 Jul. 5, 2007

Related U.S. Application Data

(63) Continuation of application No. 10/256,330, filed on Sep. 26, 2002, now Pat. No. 7,137,604.

(60) Provisional application No. 60/325,894, filed on Sep. 28, 2001.

(51) Int. Cl.
*F16M 11/24* (2006.01)

(52) U.S. Cl. .................... 248/188.2; 248/188.8

(58) Field of Classification Search .......... 248/188.2, 248/188.8, 188.3, 188.4, 649, 650, 677, 354.3, 248/346.05; 52/126.1, 126.3, 126.4, 126.6, 52/240, 243.1; 411/432, 481, 373, 377, 372.5, 411/372.6, 180
See application file for complete search history.

(56) References Cited

U.S. PATENT DOCUMENTS

| | | | |
|---|---|---|---|
| 1,173,695 A | 2/1916 | Wooley | |
| 1,482,205 A | 1/1924 | Uhl | |
| 2,314,728 A | 3/1943 | Murphy | |
| 2,402,505 A | * 6/1946 | Moore | 92/13.6 |
| 2,527,603 A | 10/1950 | Wallance | |
| 2,725,667 A | 12/1955 | Ingarra | |
| 2,890,545 A | 6/1959 | Fiddler | |
| 3,175,795 A | 3/1965 | Adams | |
| 3,470,663 A | 10/1969 | Tate | |
| 3,598,351 A | 8/1971 | Schreyer | |
| 3,868,079 A | 2/1975 | Johnson | |
| 4,015,808 A | 4/1977 | Carroll | |
| 4,080,674 A | 3/1978 | Fredman et al. | |
| 4,368,869 A | 1/1983 | Gelvezon et al. | |
| 4,413,572 A | 11/1983 | Musser | |
| 4,558,544 A | 12/1985 | Albrecht et al. | |
| 4,632,356 A | 12/1986 | Munz | |
| 4,745,867 A | 5/1988 | Niemiec | |
| 4,753,217 A | 6/1988 | Bledsoe | |
| 4,789,121 A | 12/1988 | Gidseg et al. | |
| 4,807,838 A | * 2/1989 | Anderson | 248/188.1 |
| 4,906,150 A | 3/1990 | Bennett | |

(Continued)

FOREIGN PATENT DOCUMENTS

GB 2141924 1/1985

(Continued)

*Primary Examiner*—A. Joseph Wujciak, III
(74) *Attorney, Agent, or Firm*—Brouse McDowell; Heather M. Barnes

(57) ABSTRACT

A new and improved adjustable furnace leg assembly is described herein. The furnace leg assembly is adjustable once the furnace has been set on the assembly. The furnace leg assembly has a carriage bolt with a rounded head, which allows the assembly to support the furnace on any part of the rounded head so that if the furnace shifts at any point, the bolt will adjust and the pressure will shift to wherever needed on the head of the carriage bolt to keep the furnace level.

2 Claims, 6 Drawing Sheets

U.S. PATENT DOCUMENTS

| | | |
|---|---|---|
| 4,915,334 A | 4/1990 | White |
| 4,949,923 A | 8/1990 | Daily |
| 4,974,801 A | 12/1990 | Pulsifer |
| 5,104,075 A | 4/1992 | Freeman |
| 5,141,190 A | 8/1992 | Wu |
| 5,203,039 A | 4/1993 | Fredman |
| 5,292,095 A | 3/1994 | Cattaneo |
| 5,332,182 A | 7/1994 | Weisz et al. |
| 5,462,043 A | 10/1995 | Rose et al. |
| 5,502,852 A | 4/1996 | Fredman et al. |
| 5,690,304 A | 11/1997 | Folkens |
| 5,697,586 A | 12/1997 | Lybarger |
| 5,836,556 A | 11/1998 | Kim |
| 5,913,498 A | 6/1999 | Brown et al. |
| 5,971,408 A | 10/1999 | Mandel et al. |
| 6,070,848 A | 6/2000 | Ogren |
| 6,142,431 A | 11/2000 | Herzog |
| 6,158,933 A | 12/2000 | Nicholson |
| 6,364,587 B1 | 4/2002 | Ingvarsson |
| 6,547,196 B2 | 4/2003 | Binnebose et al. |
| 6,598,841 B2 * | 7/2003 | Erickson et al. .......... 248/188.5 |
| 7,137,604 B2 * | 11/2006 | Fitzgerald ................ 248/188.2 |

FOREIGN PATENT DOCUMENTS

| | | |
|---|---|---|
| JP | 6193234 | 7/1994 |

* cited by examiner

ADJUSTABLE FURNACE LEGS

This application is a continuation application of U.S. Ser. No. 10/256,330 filed Sep. 26, 2002, now U.S. Pat. No. 7,137,604.

This application claims priority to a provisional patent application, entitled ADJUSTABLE FURNACE LEGS, Ser. No. 60/325,894, filed Sep. 28, 2001.

I. BACKGROUND OF THE INVENTION

A. Field of Invention

This invention relates to the art of adjustable support devices and more particularly to the art of adjustable support legs for furnaces.

B. Description of the Related Art

It is known in the art to use leveling devices for washing machines and clothes dryers, as well as other heavy structures, such as furniture, showcases, and laboratory benches. However, none of these devices are used on, or for, furnaces.

Currently when furnaces are installed, a piece of metal or scrap wood is placed under the furnace in order to level it. However, it is common for these pieces to move or become completely dislodged, thereby causing the furnace to become unleveled.

In the present invention, the furnace legs are adjustable after the furnace is set upon them. The furnace legs can be adjusted by using a standard wrench on the square part of a carriage bolt. The inventive adjustable furnace legs can be used on all furnaces as retrofit legs, and the furnace manufacturers will not have to supply legs or prepare furnaces for the legs, thereby eliminating additional costs.

The adjustable legs allow the furnace to be adjusted throughout the life of the furnace, so that it can maintain a level position after concrete settling or rising due to shifting of ground under the structure.

The adjustable furnace legs are attached to the furnace or air conditioning coil, at the corners or sides where the weight of the furnace or coil bears the weight of the equipment.

A carriage bolt is used to adjust the height of each corner as needed to level the equipment. The bolt, in this embodiment, has a rounded head that allows the leg to support the equipment at any point on the head.

The present invention provides new and improved adjustable furnace legs and overcomes certain difficulties inherent in the related inventions while providing better overall results.

II. SUMMARY OF THE INVENTION

In accordance with one aspect of the present invention, an adjustable leg assembly for use
with an associated furnace includes a substantially triangular support platform, the platform having a first, second, and third openings for use in attaching the platform to the associated furnace, the openings being located at each corner of the platform, a leg, the leg connected to the platform, the leg comprising a top, a base, a support member, a center line, first, second, third, and fourth flanges, the flanges connected between the platform and the support member, the first and second flanges having an angle $\alpha_1$ of 30°, angle $\alpha_1$ being measured with respect to the center line and the flange, the third and fourth flanges having an angle $\alpha_2$ of 20°, angle $\alpha_2$ being measured with respect to the center line and the flange, and bolt receiving means, the bolt receiving means being located in the base of the leg, a hex nut, the hex nut being located within the bolt receiving means, twelve raised portions, the raised portions located within the bolt receiving means, one of the raised portions located adjacent each side of the six points of the hex nut, and a carriage bolt, the carriage bolt selectively adjustably threaded through the hex nut, the bolt having a body and a rounded head.

In accordance with another aspect of the present invention, an adjustable leg assembly for use with an associated furnace includes a support platform, the platform selectively attachable to the associated furnace, at least one leg, the at least one leg connected to the platform, and adjusting means for adjusting the leg assembly.

In accordance with another aspect of the present invention, the assembly further includes receiving means for receiving the adjusting means, the receiving means having at least one point, and at least two raised portions, the raised portions being adjacent to the at least one point.

In accordance with another aspect of the present invention, the adjusting means is a carriage bolt and the receiving means is a hex nut.

In accordance with another aspect of the present invention, the bolt has a rounded head.

In accordance with another aspect of the present invention, the assembly includes twelve raised portions, the raised portions located within a bolt receiving means, one of the raised portions located adjacent each side of the six points of the hex nut.

In accordance with another aspect of the present invention, the at least one leg further includes a top, a base, a support member, a center line, and first, second, third, and fourth flanges, the flanges connected between the platform and the support member, the first and second flanges having an angle $\alpha_1$ of 30°, angle $\alpha_1$ being measured with respect to the center line and the flange, the third and fourth flanges having an angle $\alpha_2$ of 20°, angle $\alpha_2$ being measured with respect to the center line and the flange.

In accordance with another aspect of the present invention, a method for leveling a furnace includes the steps of providing an adjustable leg assembly, the adjustable leg assembly having a platform, a leg, and adjusting means, attaching the platform to the furnace, and adjusting the platform until the furnace is substantially level.

In accordance with another aspect of the present invention, providing an adjustable leg assembly, the adjustable leg assembly having a platform, a leg, and adjusting means includes the step of providing an adjustable leg assembly, the adjustable leg assembly having a platform, a leg, adjusting means, receiving means for receiving the adjusting means, the receiving means having at least one point, and at least two raised portions, the raised portions being adjacent to the at least one point.

In accordance with another aspect of the present invention, providing an adjustable leg assembly, the adjustable leg assembly having a platform, a leg, adjusting means, receiving means for receiving the adjusting means, the receiving means having at least one point, and at least two raised portions, the raised portions being adjacent to the at least one point includes the step of providing an adjustable leg assembly, the adjustable leg assembly having a platform, a leg, a bolt, a hex nut, the hex nut having at least two raised portions, the raised portions being adjacent to at least one point on the hex nut, the leg having a top, a base, a support member, a center line, and first, second, third, and fourth flanges, the flanges connected between the platform and the support member, the first and second flanges having an angle $\alpha_1$ of 30°, angle $\alpha_1$ being measured with respect to the center line and the flange, the third and fourth flanges having an angle $\alpha_2$ of 20°, angle $\alpha_2$ being measured with respect to the center line and the flange.

In accordance with another aspect of the present invention, an adjustable leveling device includes a platform, a leg, adjusting means for adjusting the device, receiving means for receiving the adjusting means, and at least two raised portions for holding the receiving means in place.

Still other benefits and advantages of the invention will become apparent to those skilled in the art upon reading and understanding of the following detailed specification.

III. BRIEF DESCRIPTION OF THE DRAWINGS

IV. DESCRIPTION OF THE INVENTION

Figure 1:
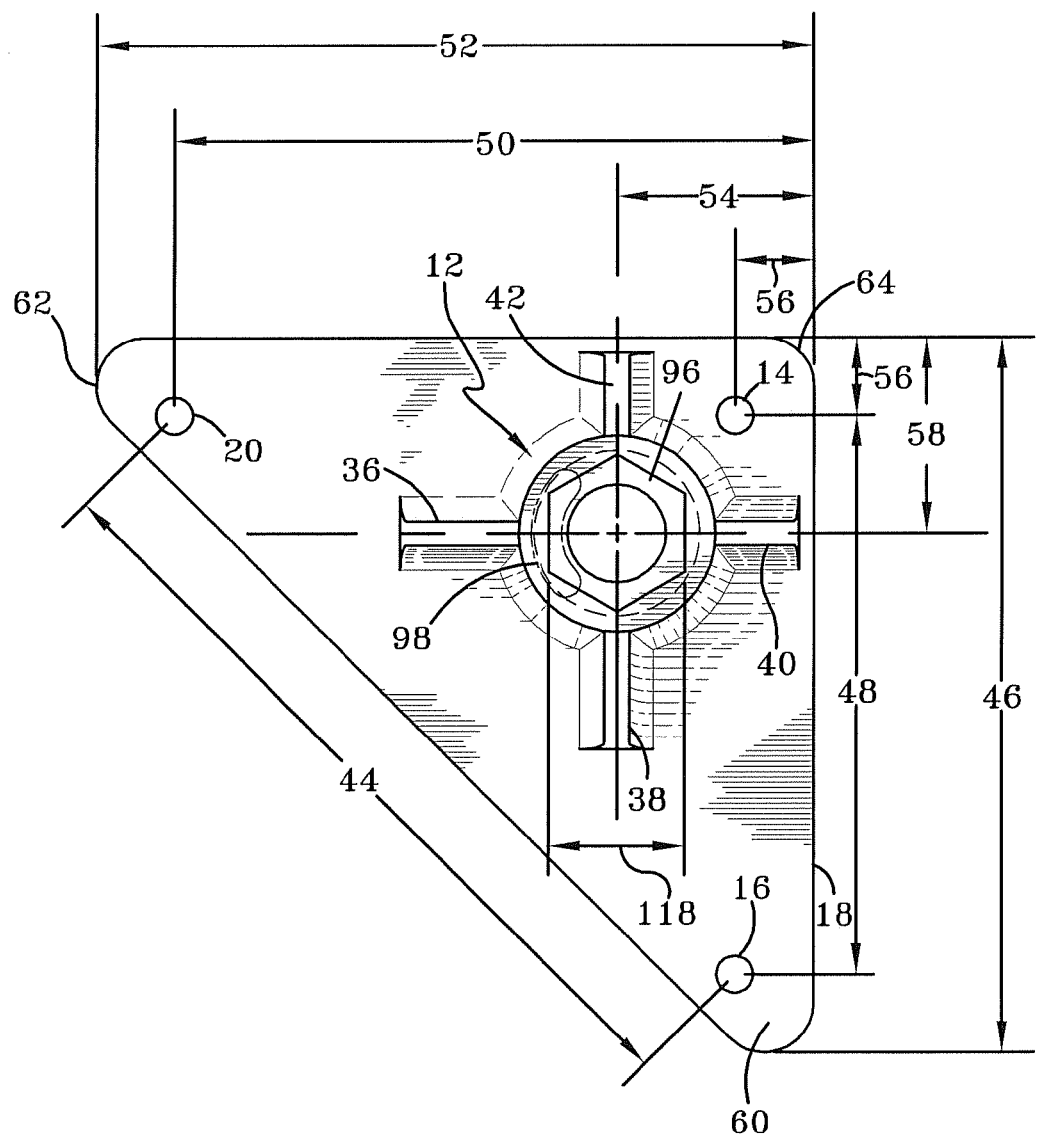
FIG. 1 is a top view of the adjustable leg assembly.

With reference to FIGS. 1-6, an adjustable furnace leg assembly 10 is shown. The assembly 10 has a leg 12, a support member 22, a base 24, a top 28, a support platform 18, a bolt receiving means 26, a first flange 36, a second flange 38, a third flange 40, a fourth flange 42, a first centerline 92, a hex nut 96, and a carriage bolt 30. The support platform 18 has a first corner 60, a second corner 62, a third corner 64, a top 94, and a bottom 90. The support platform 18, in this embodiment, is triangular in shape, so that it can be applied to the four corners of the associated furnace 32. The third corner 64 will approximately line up with the corner of the furnace 32. However, it is to be understood, that the support platform 18 can be any shape chosen using sound engineering judgment.

The support platform 18, as shown in FIG. 1, has three openings 14, 16, 20 for attaching the support platform 18 to the furnace 32. The means for attaching the platform 18 to the furnace 32 is not limited to any particular means, as long as chosen using sound engineering judgment. In this embodiment, the leg 12 is integrally attached to the support platform 18, and extends downwardly toward the floor, culminating with the base member 24. The bolt receiving means 26 is located centrally in the body 22 of the adjustable furnace leg 12.

With continuing reference to FIG. 1, the flanges 36, 38, 40, 42 help receive and support the leg 12 as it is connected to the bottom 90 of the support platform 18. The first and second flanges 36, 38 form an angle $\alpha_1$ 74, and third and fourth flanges form an angle $\alpha_2$ 76, both with respect to the centerline 92. In this embodiment a, 74 is approximately 30° and $\alpha_2$ 76 is approximately 20°. It is to be understood, that the configuration of the platform 18, and the configuration and angles $\alpha_1$, $\alpha_2$ 74, 76 of the flanges 36, 38, 40, 42, is merely intended to show one embodiment of this invention and is not intended to limit it in any manner. The support platform 18 and the connection of the leg 12 therewith, can be accomplished in any manner chosen using sound engineering judgment.

Figure 3:
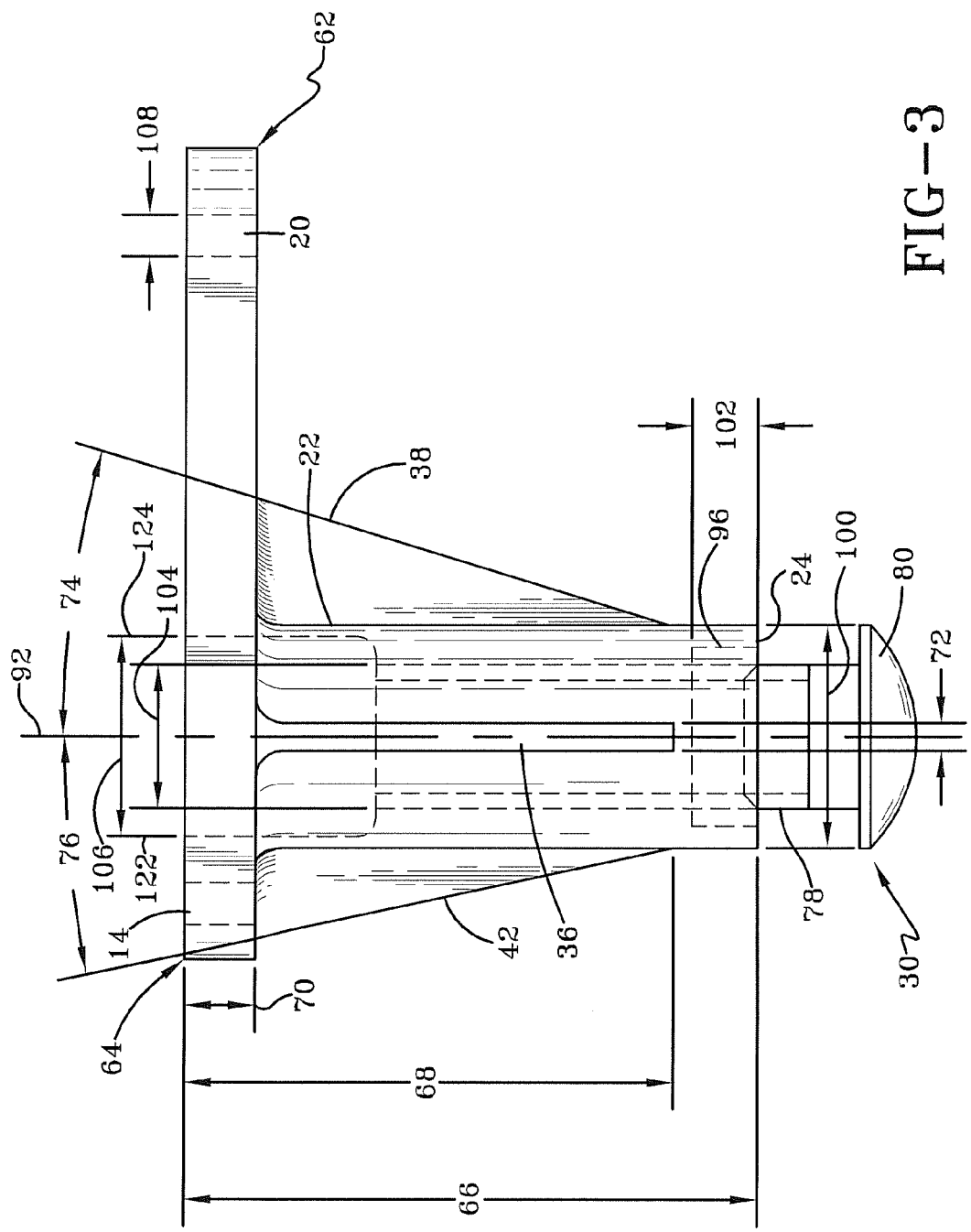
FIG. 3 is a side view of the adjustable leg assembly, showing the carriage bolt and rounded head.

With reference to FIG. 3, the carriage bolt 30 is shown to have a rounded head 80. The rounded head 80 of the carriage bolt 30 allows the leg 12 to support the furnace 32 at any part of the rounded head 80. If the furnace 32 slopes at any point, the rounded head 80 of the bolt 30 adjusts and the pressure will shift to wherever needed on the head 80 to keep the furnace 32 level. The carriage bolt 30 as seen in FIG. 3, is threaded into the hex nut 96, which is internal to the carriage bolt receiving means 26 of the leg 12. The carriage bolt 30 can be adjusted upwardly or downwardly as needed to level each individual side of the furnace 32. It is to be understood however, that the location of the bolt receiving means 26, and the manner in which the carriage bolt 30 is received by the hex nut 96 is merely one embodiment of this invention and is not intended to limit it in any manner.

Figure 6:
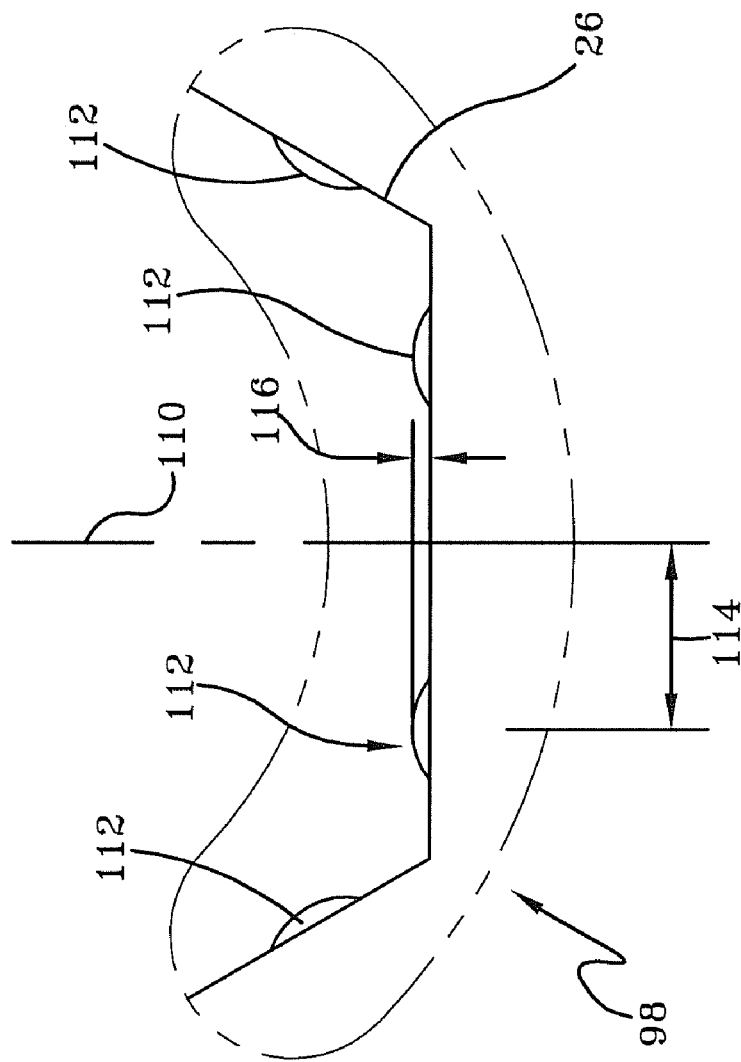

With reference now to FIGS. 1, 3, and 6, the bolt 30 is received by the hex nut 96. FIG. 6 shows an exploded view of section A 98 of FIG. 1. Section A 98 shows second centerline 110, bumps 112, width $W_7$, and height $H_4$. The bumps 112 are attached to the interior portion of the bolt receiving means 26, and are spaced such that the hex nut 96 will fit securely within the bumps 112, with each point of the hex nut 96 having a bump 112 on either side. The bumps 112 hold the hex nut 96 in place within the bolt receiving means 26, so that when the bolt 30 is threaded through the hex nut 96, the hex nut 96 stays in place. It is to be understood that the number and configuration of the bumps 112 is intended to show one embodiment of this invention, and is not intended to limit the invention in any manner. Any number of bumps 112 could be used, and any manner of holding the hex nut 96 could be used, as long as chosen using sound engineering judgment. It is also to be understood that the invention is not limited to the use of a hex nut. Any means of adjustably leveling the furnace may be used, as long as chosen using sound engineering judgment.

Figure 2:
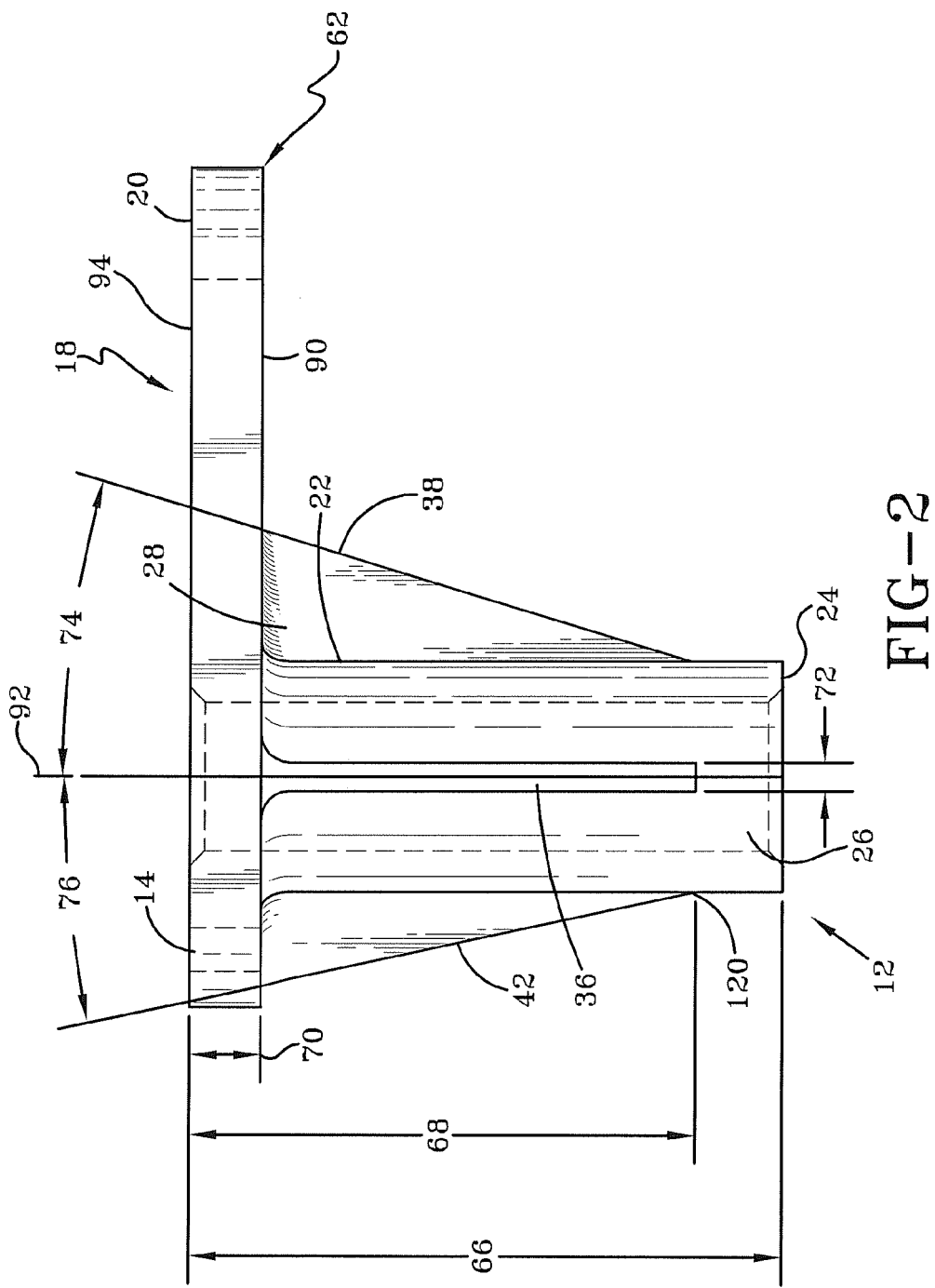
FIG. 2 is a the side view of the adjustable leg assembly.

With reference now to FIGS. 1-3, and 6, FIG. 1 shows lengths $L_1$, $L_2$, $L_3$, $L_4$, $L_5$, $L_6$, $L_7$, and $L_8$ 44, 46, 48, 50, 52, 54, 56, 58, and width $W_7$ 118. In this embodiment, length $L_1$ 44 is 4.44 inches and is measured between the first and second corners 60, 62; length $L_2$ 46 is 3.89 inches and is measured between the first and third corners 60, 64; length $L_3$ 48 is 2.81 inches and is measured between the centers of the first and second openings 14, 16; length $L_4$ 50 is 3.00 inches and is measured between the center of the third opening 20 and the third corner 64; length $L_5$ 52 is 3.89 inches and is measured between the second and third corners 62, 64; length $L_6$ 54 is 0.70 inches and is measured between the third corner 64 and the center of the fourth flange 42; length $L_7$ 56 is 0.19 inches and is measured between the third corner 64 and the center of first opening 14; length $L_8$ 58 is 0.70 inches and is measured between the third corner 64 and the center of the third flange 40; and width $W_7$ 118 is 0.75 inches and is the width of the hex nut 96. FIG. 2 shows heights $H_1$, $H_2$, $H_3$ 66, 68, 70 and width $W_1$ 72. In this embodiment, height $H_1$ 66 is 2.00 inches and is measured between the top 94 of platform 18 and the base 24; height $H_2$ 68 is 1.70 inches and is measured between the top 94 of platform 18 and the connection of the fourth flange 42 to the support member 22 at point B 120; height $H_3$ 70 is 0.25 inches and is measured between the top 94 and the bottom 90 of the platform 18; and width $W_1$ 72 is 0.13 inches and is the width of the flanges 36, 38, 40, 42. FIG. 3 show widths $W_2$, $W_3$, $W_4$, and $W_5$ 100, 104, 106, 108 and height $H_5$ 102. In this embodiment, width $W_2$ 100 is 1.125 inches and is the width of the support member 22; height $H_5$ 102 is 0.63 inches and is the height of the hex nut 96; width $W_3$ 104 is 0.505 inches and is the width of the body 78 of the bolt 30; width $W_4$ 106 is 0.89 inches and is measured between points C and D, 122, 124; and width $W_5$ 108 is 0.20 inches and is the width of the openings 14, 16, 20. FIG. 6 shows width $W_6$ 114 and height $H_4$ 116. In this embodiment width $W_6$ 114 is 0.127 inches and is measured between the center of a bump 112 and the second centerline 110 and height $H_4$ 116 is 0.01 inches and is the height of the bumps 112. It is to be understood that the above measurements are merely intended to describe one embodiment of the invention, and are not intended to limit the invention in any manner. Any lengths, widths, and heights may be used, as long as chosen using sound engineering judgment.

Figure 4B:
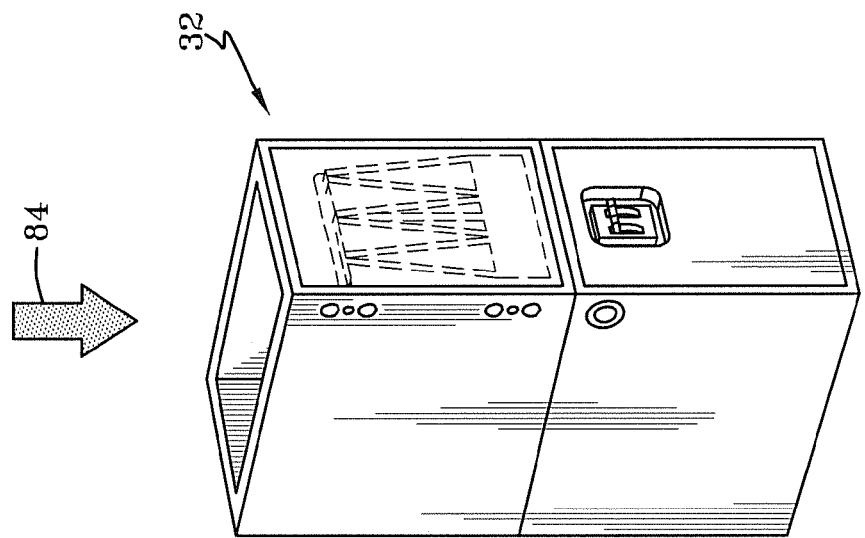
FIG. 4b is a perspective view of a furnace in a vertical position, with a downward airflow, without the adjustable legs.
Figure 4A:
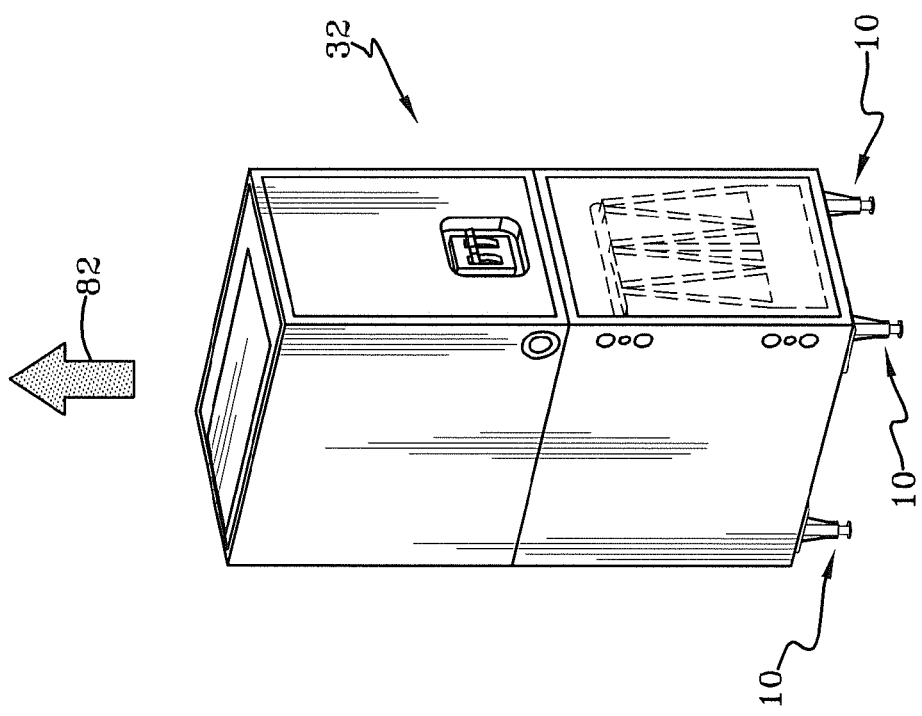
FIG. 4a is a perspective view of a furnace in a vertical position, with an upward airflow, showing the adjustable legs.
Figure 5B:
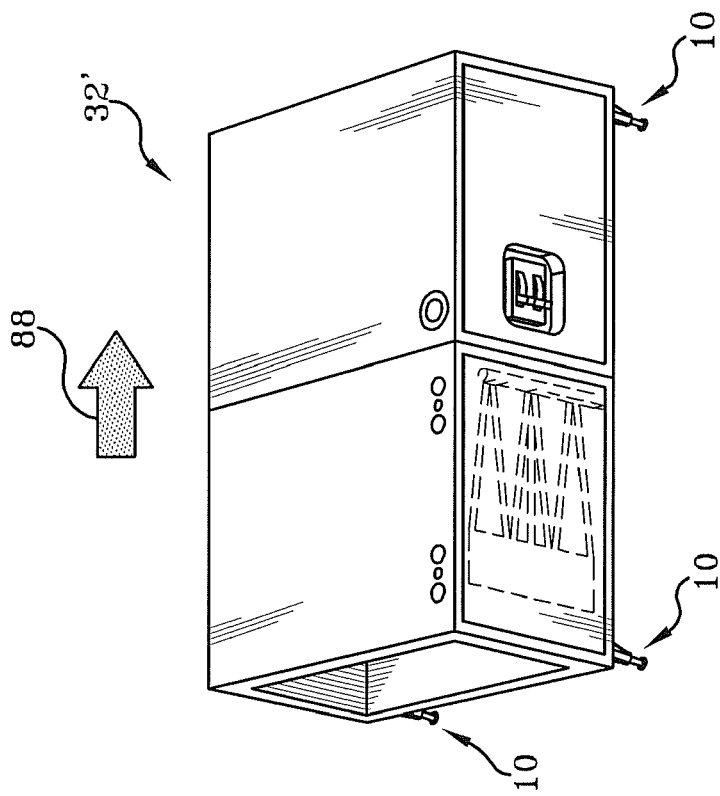
FIG. 5b is a perspective view of a horizontal furnace, with a rightward airflow, showing the adjustable legs; and, FIG. 6 is an exploded view of Section A of FIG. 1.
Figure 5A:
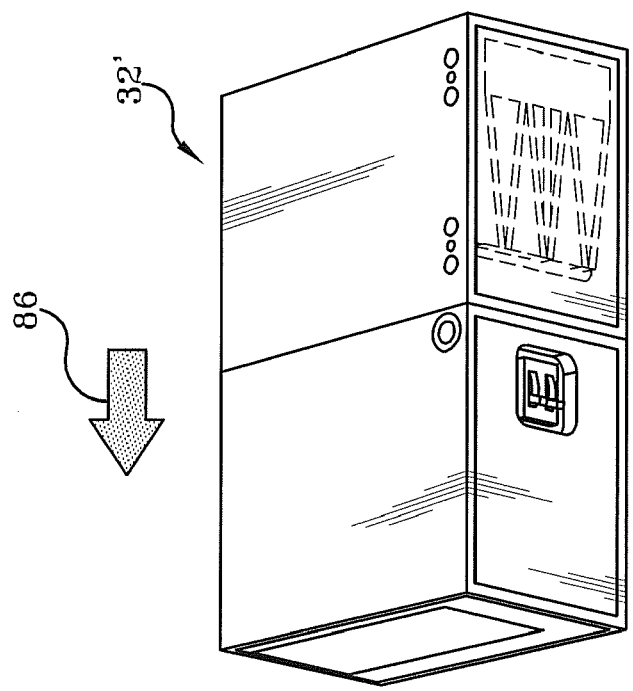
FIG. 5a is a perspective view of a horizontal furnace, with a leftward airflow, without the adjustable legs.

With reference to FIGS. 4a, 4b, 5a, and 5b, associated furnaces 32, 32' are shown. As can be seen in FIGS. 4a and 5b, the furnace leg assembly 10 is attached to each corner of the furnace 32, 32'. The individual furnace leg assembly 10 being located on individual corners of the furnace 32, 32' which allows each individual leg 12 to be adjusted independently of the other leg assembly 10. The leg assembly 10 can be used regardless of how the furnace 32, 32' is installed, and which position it is in.

With reference now to FIGS. 1-6, the operation of the leg assembly 10 will be described. In this embodiment, the carriage bolt 30 is threaded through the hex nut 96, while the hex nut 96 is being held in place by the bumps (raised portions) 112. The assembly 10 is connected to the furnace 32, 32' through openings 14, 16, 20 using any connecting means chosen using sound engineering judgment. Once the leg assemblies 10 are attached to the furnace 32, 32', the user can adjust the level of the assemblies 10 by turning the bolts 30 clockwise or counterclockwise depending on whether the assemblies 10 need to be raised or lowered.

The invention has been described with reference to at least one embodiment. Obviously, modifications and alterations will occur to others upon a reading and understanding of this specification. It is intended to include all such modifications and alternations in so far as they come within the scope of the appended claims or the equivalence thereof.

What is claimed is:

1. A method for leveling a furnace, the method comprising the steps of:

providing an adjustable leg assembly, the adjustable leg assembly having a platform, a leg, adjusting means for adjusting the leg assembly, and receiving means for receiving the adjusting means, the receiving means having at least one point, and at least two raised portions, the raised portions being adjacent to the at least one point, the leg having a top, a base, and a support member, the receiving means being located in the base of the leg;

attaching the platform to the furnace; and, adjusting the platform until the furnace is substantially level.

2. The method of claim 1, wherein providing an adjustable leg assembly, the adjustable leg assembly having a platform, a leg, adjusting means, receiving means for receiving the adjusting means, the receiving means having at least one point, and at least two raised portions, the raised portions being adjacent to the at least one point comprises the step of:

providing an adjustable leg assembly, the adjustable leg assembly having a platform, a leg, a bolt, a hex nut, the hex nut having at least two raised portions, the raised portions being adjacent to at least one point on the hex nut, the leg having a top, a base, a support member, a center line, and first, second, third, and fourth flanges, the flanges connected between the platform and the support member, the first and second flanges having an angle $\alpha_1$ of 30°, angle $\alpha_1$ being measured with respect to the center line and the flange, the third and fourth flanges having an angle $\alpha_2$ of 20°, angle $\alpha_2$ being measured with respect to the center line and the flange.

* * * * *